Nov. 14, 1967   W. CHAN ETAL   3,352,061
DOOR OVERTRAVEL MECHANISM
Filed Oct. 21, 1965
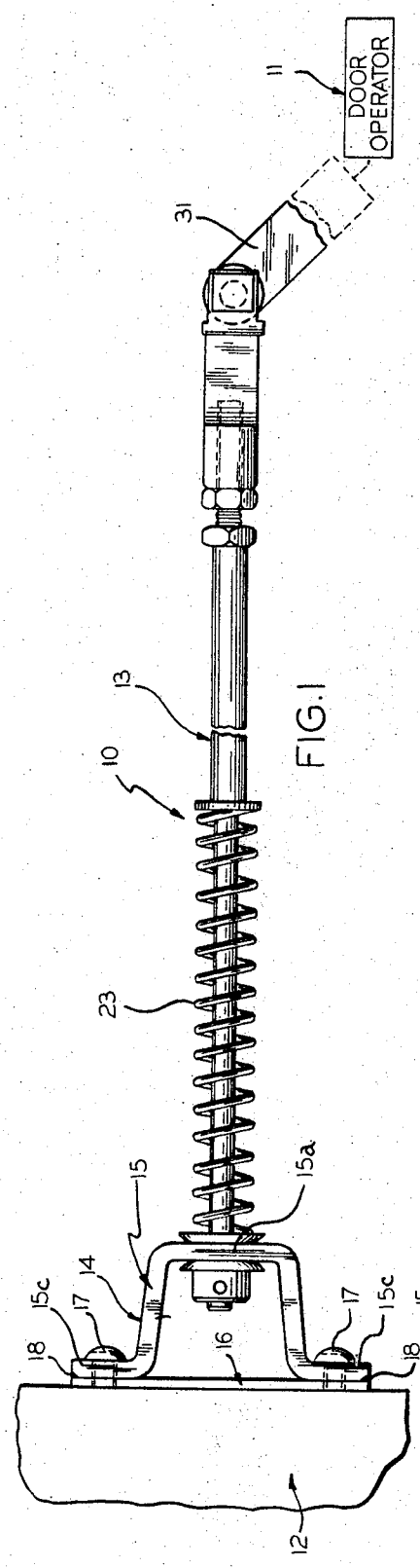
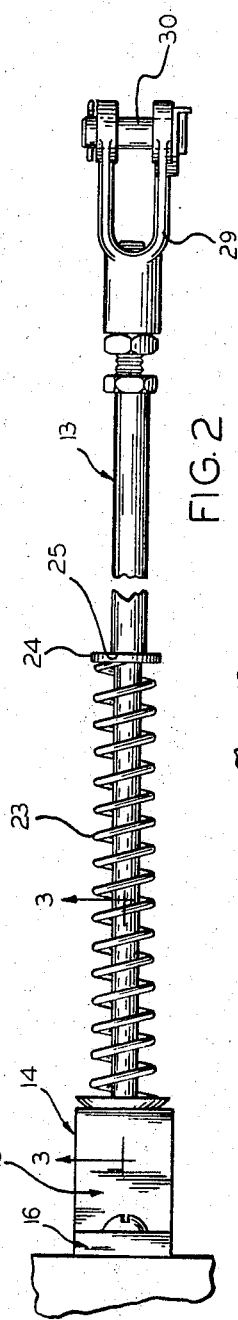
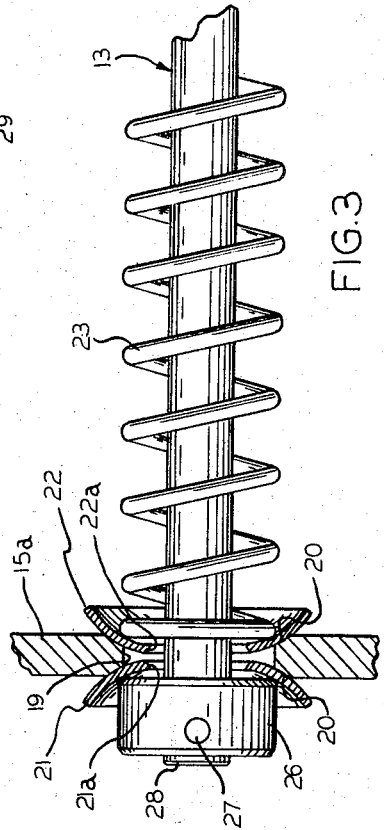
INVENTORS
WILLIAM CHAN
JOHN G. DEVINE
CHARLES O. KLEIN
BY
ATTORNEY

United States Patent Office 3,352,061
Patented Nov. 14, 1967

3,352,061
DOOR OVERTRAVEL MECHANISM
William Chan, Brookfield, Jon Gregory De Vine, Cary, and Charles O. Klein, Berwyn, Ill., assignors to Vapor Corporation, Chicago, Ill., a corporation of Delaware
Filed Oct. 21, 1965, Ser. No. 499,492
6 Claims. (Cl. 49—507)

ABSTRACT OF THE DISCLOSURE

An overtravel mechanism for vehicle doors including conically shaped retainers received on a rod and coacting with a bracket to permit angular movement between the rod and bracket.

---

This invention relates in general to an overtravel mechanism to be employed in the control of doors, and more particularly to an overtravel mechanism for use in control of doors operable in a vehicle, although other uses and purposes may be apparent to one skilled in the art.

The overtravel mechanism of the present invention is especially useful in passenger vehicles having slidable doors that open and close for the passengers, and which may be easily adapted for use in any installation. The mechanism includes a connecting rod having one end connected to a door operator and the other end freely received in an opening of a bracket that is attached to the door and which end is secured to the bracket so that relative overtravel movement may be effected between the door and the connecting rod. A pair of conical retainers arranged in opposing relationship and one on each side of the bracket are provided with bores therethrough for receiving the connecting rod. One of the retainers bottoms one end of a compression spring guidably arranged along the connecting rod with its other end bottomed against a stop on the connecting rod, while the other retainer is held on the end of the connecting rod by means of the collar or spacer and pin arrangement. Any angular movement may be effected between the connecting rod and the bracket without having any undue wearing effect on the associated parts.

Therefore, it is an object of the present invention to provide a new and improved overtravel mechanism for use between door operators and doors.

Another object of this invention is to provide an overtravel mechanism to be arranged between a door operator and a door that is constructed to allow any required pivot motion between the components during door operation.

A further object of this invention resides in the provision of an overtravel mechanism for sliding doors that is self-aligned and requires no special guides, that may be easily assembled and disassembled by using ordinary hand tools, and that is capable of withstanding high vibration.

A still further object of the present invention is to provide an overtravel mechanism that is maintenance-free and does not require lubrication, and is self-cleaning, while eliminating the possibility of rusting or freezing of the connection joint.

Another object of the present invention is to provide an overtravel mechanism that reduces the area of bearing surfaces and associated friction and wear.

Other objects, features and advantages of the invention will be apparent from the following detailed disclosure, taken in conjunction with the accompanying sheet of drawings, wherein like reference numerals refer to like parts, in which:

FIG. 1 is a front elevational view of the overtravel mechanism in accordance with the present invention, and illustrating more or less diagrammatically its association with a door operator and a door;

FIG. 2 is a top plan view of the door operator of FIG. 1; and

FIG. 3 is a greatly enlarged detail sectional view taken substantially along line 3—3 of FIG. 2.

Referring now to the drawings, the overtravel mechanism of the present invention is generally indicated by the numeral 10 and is interconnected between a door operator 11 and a door 12, wherein energization of the door operator 11 will cause sliding movement of the door 12 through the overtravel mechanism 10 when the door is being moved between open and closed positions. The overtravel mechanism includes generally a connecting rod 13, a mounting bracket assembly 14, and means for interconnecting the connecting rod with the mounting bracket assembly.

The mounting bracket assembly includes a U-shaped bracket 15 having a bight portion 15a, opposed legs 15b, and terminal attaching ears 15c, and a backing plate 16. The attaching ears 15c have openings therethrough aligning with openings extending through the backing plate through which fasteners 17 may extend to secure the mounting bracket assembly to the door 12. The attaching ears 15c abut directly against the backing plate 16 and are suitably secured thereto such as by welds 18. The bight portion 15a extends in opposed parallel spaced relationship to the backing plate 16, and is provided with an opening 19 therethrough to freely receive one end of the connecting rod 13. The opening 19 is sized substantially larger than the end of the connecting rod extending therethrough as seen particularly in FIG. 3.

The opposite sides of the bight portion 15a is chamfered to define chamfered faces 20 at the opposite ends of the opening 19. A pair of opposed identical conical convexo-concavo retainers 21 and 22 are arranged so that one is on each side of the bight portion 15a and in engagement with a corresponding chamfered face. The retainers are provided with bores 21a and 22a, respectively, through which the end of the connecting rod projects.

The conical retainer 22 serves to bottom one end of a compression spring 23 that is received over the connecting rod, and bottomed at the other end against a washer 24 that is abutting against a shoulder 25 formed on the connecting rod. An annular spacer or collar 26 is freely received over the end of the connecting rod and bottomed against the retainer 21, and held against movement over the end of the connecting rod by a spiral pin 27 that extends transversely through a bore in the end of the connecting rod and projects from opposite ends thereof. The free end 28 of the connecting rod is induction hardened to prevent mushrooming when collapsing against the backing plate 16. Protection against damaging of the edge of the door 12 is provided by the backing plate 16. Thus, an applied load to the door 12 against the movement of the connecting rod will permit movement of the door against the force of the compression spring 23 until the free end 28 of the connecting rod strikes the backing plate 16. Further, the conical retainers 21 and 22 coact with the chamfered faces 20 of the bracket bight portion 15a to allow the connecting rod to pivot in the mounting bracket assembly without creating any undue forces on the bracket or connecting rod.

While the connecting rod 13 may be connected in any suitable manner to the door operator 11, a yoke 29 may be threadedly received on the end of the connecting rod and provided with a pin 30 for connection to a crank or lever 31 that is in turn connected to the door operator 11. Inasmuch as pivotal movement can be tolerated between the connecting rod and mounting bracket assembly, any suitable linkage arrangement may be employed to connect the door operator to the connecting rod.

It will be understood that modifications and variations may be effected without departing from the scope of the novel concepts of the present invention, but it is understood that this application is to be limited only by the scope of the appended claims.

The invention is hereby claimed as follows:

1. A door overtravel mechanism interconnected between a door and a door operator comprising a connecting rod connected at one end to a door operator, a mounting bracket attached to said door and having an opening therethrough for receiving the other end of said rod, and means for impositively attaching said other end of said rod to said bracket including a pair of conical convexo-concavo retainers, one on each side of the bracket and having bores therethrough aligning with said opening and receiving said other end of said rod, said opening being substantially larger than said bores, the convexo sides of the retainers facing each other and being partially received within said opening, a compression spring bottomed on one end against one of the retainers and at the other end against a stop along said rod, a collar received over said other end of said connecting rod and against said other of said retainers, and a spiral pin extending transversely through said rod for preventing movement of said collar therefrom.

2. The combination as defined in claim 1, wherein said conical retainers are identical.

3. The combination as defined in claim 1, wherein said bracket is provided with chamfered faces about opposite ends of said opening against which the convexo sides of said retainers bear.

4. The combination as defined in claim 1, wherein said stop includes a washer bottoming against a shoulder formed along said rod.

5. A door overtravel mechanism interconnected between a door and a door operator comprising a connecting rod connected at one end to a door operator, a U-shaped bracket having mounting ears attached to said door and a bight portion spaced therefrom and having an opening therethrough for freely receiving the other end of said rod, said bracket bight portion having chamfered faces on opposite sides thereof about said opening, and means for impositively attaching said other end of said rod to said bracket including a pair of conical convexo-concavo retainers, one on each side of the bracket and having bores therethrough aligning with said opening and receiving said other end of said rod, said opening being substantially larger than said bores, the convexo side of said retainers facing each other and being partially received within said opening, said convexo sides of said retainers in sliding contact with said chamfered faces, a compression spring bottomed on one end against one of the retainers and at the other end against a stop along said rod, a collar received over said other end of said connecting rod and against said other of said retainers, and a spiral pin extending transversely through said rod for preventing movement of said collar therefrom.

6. A door overtravel mechanism interconnected between a door and a door operator comprising a connecting rod connected at one end to a door operator, a mounting bracket assembly attached to said door including a U-shaped bracket having attaching ears and a backing plate for said rod secured to said attaching ears, the bight portion of said bracket being spaced opposite from said backing plate and having an opening therethrough for freely receiving the other end of said rod, said bracket bight portion having chamfered faces on opposite sides thereof about said opening, and means for impositively attaching said other end of said rod to said bracket including a pair of conical convexo-concavo retainers, one on each side of the bracket and having bores therethrough aligning with said opening and receiving said other end of said rod, said opening being substantially larger than said bores, the convexo side of said retainers facing each other and being partially received within said opening, said convexo sides of said retainers in sliding contact with said chamfered faces, a compression spring bottomed on one end against one of the retainers and at the other end against a stop along said rod, a collar received over said other end of said connecting rod and against said other of said retainers, and a spiral pin extending transversely through said rod for preventing movement of said collar therefrom.

References Cited

UNITED STATES PATENTS

| | | | |
|---|---|---|---|
| 2,851,266 | 9/1958 | Klamp | 49—26 |
| 3,104,098 | 9/1963 | Daugirdas | 49—280 X |
| 3,269,058 | 8/1966 | Lynn et al. | 49—14 |

DAVID J. WILLIAMOWSKY, *Primary Examiner.*

J. K. BELL, *Examiner.*